United States Patent
Cheng

(10) Patent No.: US 8,134,845 B2
(45) Date of Patent: Mar. 13, 2012

(54) ELECTROMAGNETIC INTERFERENCE SUPPRESSING APPARATUS FOR HIGH-FREQUENCY SIGNAL GENERATION DEVICE

(75) Inventor: Ming Cheng, Shanghai (CN)

(73) Assignee: Koninklijke Philips Electronics N.V., Eindhoven (NL)

( * ) Notice: Subject to any disclaimer, the term of this patent is extended or adjusted under 35 U.S.C. 154(b) by 315 days.

(21) Appl. No.: 12/521,165

(22) PCT Filed: Dec. 24, 2007

(86) PCT No.: PCT/IB2007/055303
§ 371 (c)(1),
(2), (4) Date: Jun. 25, 2009

(87) PCT Pub. No.: WO2008/081392
PCT Pub. Date: Jul. 10, 2008

(65) Prior Publication Data
US 2010/0118506 A1    May 13, 2010

(30) Foreign Application Priority Data
Dec. 31, 2006 (CN) .................. 2006 2 0173317 U

(51) Int. Cl.
*H05K 9/00* (2006.01)
*G05F 1/00* (2006.01)
*H05B 41/16* (2006.01)

(52) U.S. Cl. ......... 361/816; 361/818; 315/291; 315/277

(58) Field of Classification Search .................. 361/818; 315/97, 277, 291, 219
See application file for complete search history.

(56) References Cited

U.S. PATENT DOCUMENTS

| | | | | |
|---|---|---|---|---|
| 2,796,554 A | * | 6/1957 | Strecker | 315/97 |
| 3,753,076 A | * | 8/1973 | Zelina | 363/133 |
| 4,270,071 A | * | 5/1981 | Morton | 315/62 |
| 4,939,427 A | * | 7/1990 | Nilssen | 315/209 R |
| 5,128,592 A | * | 7/1992 | Dean et al. | 315/224 |
| 5,173,839 A | | 12/1992 | Metz | |

(Continued)

FOREIGN PATENT DOCUMENTS

EP    1175131 A2    1/2002
(Continued)

OTHER PUBLICATIONS

Billings, K.: "Switchmode Power Supply Handbook"; McGraw Hill Inc., 1989, pp. 1.31-1.48.

(Continued)

Primary Examiner — Timothy Thompson
Assistant Examiner — Sherman Ng

(57) ABSTRACT

The present utility model relates to an electromagnetic interference suppressing apparatus for a high-frequency signal generation device. The high-frequency signal generation device includes an inverter means which is used for converting a direct current signal into a high-frequency alternating current signal, wherein the electromagnetic interference suppressing apparatus includes an electric conductor which is in capacitive or inductive coupling with the high-frequency signal generation device and is connected to the reference zero voltage point of the direct current signal. With the present utility model, the electromagnetic interference generated by the high-frequency signal generation device may be effectively suppressed in the case where a reliable earthing is not achievable. The present utility model relates also to an electronic ballast having the function of suppressing electromagnetic interference, and a fluorescent lamp of a compact type having the function of suppressing electromagnetic interference.

5 Claims, 3 Drawing Sheets

U.S. PATENT DOCUMENTS

| | | | |
|---|---|---|---|
| 5,249,099 A * | 9/1993 | Sridharan et al. | 361/674 |
| 5,481,160 A * | 1/1996 | Nilssen | 315/209 R |
| 6,005,355 A * | 12/1999 | Siao | 315/277 |
| 6,018,220 A * | 1/2000 | Nerone | 315/219 |
| 6,548,948 B1 * | 4/2003 | Muessli | 313/318.01 |
| 6,577,066 B1 * | 6/2003 | Kominami et al. | 315/58 |
| 6,825,620 B2 * | 11/2004 | Kuennen et al. | 315/224 |
| 2004/0061453 A1 * | 4/2004 | Konopka et al. | 315/291 |
| 2006/0007059 A1 | 1/2006 | Bell | |
| 2006/0087258 A1 | 4/2006 | Kubota et al. | |
| 2007/0070584 A1 * | 3/2007 | Quazi | 361/641 |

FOREIGN PATENT DOCUMENTS

| | | |
|---|---|---|
| GB | 2195843 A | 4/1988 |

OTHER PUBLICATIONS

Wang J.: "Reduction in Conducted EMI Noises of a Switching Power Supply After Thermal Management Design"; IEE Proc-Electric Power Applications, vol. 150, No. 3, May 2003, pp. 301-310.

* cited by examiner

ELECTROMAGNETIC INTERFERENCE SUPPRESSING APPARATUS FOR HIGH-FREQUENCY SIGNAL GENERATION DEVICE

FIELD OF THE UTILITY MODEL

This utility model relates to an electromagnetic interference suppressing apparatus, in particular, to an electromagnetic interference suppressing apparatus for high-frequency signal generation device. The present utility model relates also to an electronic ballast and to a fluorescent lamp of a compact type.

BACKGROUND OF THE UTILITY MODEL

There are two types of electromagnetic interference (EMI), i.e. transmission interference and radiation interference. The transmission interference is mainly the one mutually generated by the interference signal generated by an electronic device through a dielectric or common power supply line, and the radiation interference refers to the interference signal generated by an electronic device that is transmitted to another electric network or electronic device via spatial coupling. To prevent the electromagnetic interference generated by some electronic products from affecting or damaging the normal operation of other electronic devices, various governments or international organizations have proposed or established one after another some regulations or standards for the generation of electromagnetic interference, and the products conforming such regulations or standards are referred to as having electromagnetic compatibility (EMC).

Having or not electromagnetic compatibility is an important criterion in the examination of the qualification of an electronic product. Electromagnetic interference is an issue needing to be particularly paid attention to for some electronic devices using high-frequency signal in operation, i.e. those referred to as high-frequency signal generation devices in the present invention. For example, the electronic ballast used for driving such gas discharge lamps as fluorescent lamps, etc. in operation is a typical high-frequency signal generation device. In operation, electronic ballasts need usually to convert a conventional alternating current signal into a high-frequency alternating current signal via rectifying and inverter circuits to drive a fluorescent lamp, thus, the electromagnetic interference generated in such a process needs suppressing effectively.

The methods for suppressing electromagnetic interferences usually include filtering, shielding and earthing, etc. The method of filtering usually needs larger capacitors or inductors to be connected in the circuit, thus the cost is higher and the connection is complicated. In the methods of shielding, a reliable way of earthing is needed for desirable effects; when the earthing is not readily achieved, it is difficult to suppress the electromagnetic interference effectively using the methods of shielding and earthing and therefore, the application is limited.

SUMMARY OF THE UTILITY MODEL

An object of the present utility model is to provide an electromagnetic interference suppressing apparatus which may effectively achieve the suppression of electromagnetic interference without the need for reliable earthing.

To achieve the above object, the present utility model proposes an electromagnetic interference suppressing apparatus for high-frequency signal generation device. The high-frequency signal generation device comprises an inverter means which is used for converting a direct current signal into a high-frequency alternating current signal, wherein the electromagnetic interference suppressing apparatus includes an electric conductor which is in capacitive or inductive coupling with the high-frequency signal generation device and is connected to the reference zero voltage point of the direct current signal.

Another object of the present utility model is to provide an electronic ballast system capable of suppressing effectively the electromagnetic interference without the need for reliable earthing.

To achieve this object, the present utility model proposes an electronic ballast system comprising an electronic ballast and an electric conductor; the electronic ballast includes a rectifying means for converting a low-frequency alternating current signal into a direct current signal and an inverter means for converting the direct current signal into a high-frequency alternating current signal; the electric conductor is disposed around the electronic ballast, coupled to the electronic ballast via a capacitor or an inductor and connected to the reference zero voltage point of the direct current signal.

A further object of the present utility model is to provide an energy-saving lamp of compact type capable of suppressing effectively the electromagnetic interference without the need for reliable earthing.

To achieve this object, the present utility model proposes an energy-saving lamp of compact type comprising a lamp enclosure portion; such an enclosure portion is provided with an electronic ballast inside, and the electronic ballast includes a rectifying means for converting a low-frequency alternating current signal into a direct signal and an inverter means for converting the direct current signal into a high-frequency alternating current signal; the lamp enclosure portion includes a metal enclosure inside, the metal enclosure is disposed between the electronic ballast and the lamp enclosure, coupled to the electronic ballast via a capacitor or an inductor and connected to the reference zero voltage point of the direct current signal in the electronic ballast.

These and other aspects of the present utility model will be further explained from the embodiments described below.

BRIEF DESCRIPTION OF THE DRAWINGS

The present utility model shall be further explained with reference to the accompanying drawings, in which.

In all the figures above, like reference signs represent the same, similar or corresponding functional characteristics, and the same, similar or corresponding functional characteristics are represented with like signs.

DETAILED DESCRIPTION OF THE UTILITY MODEL

Figure 1:
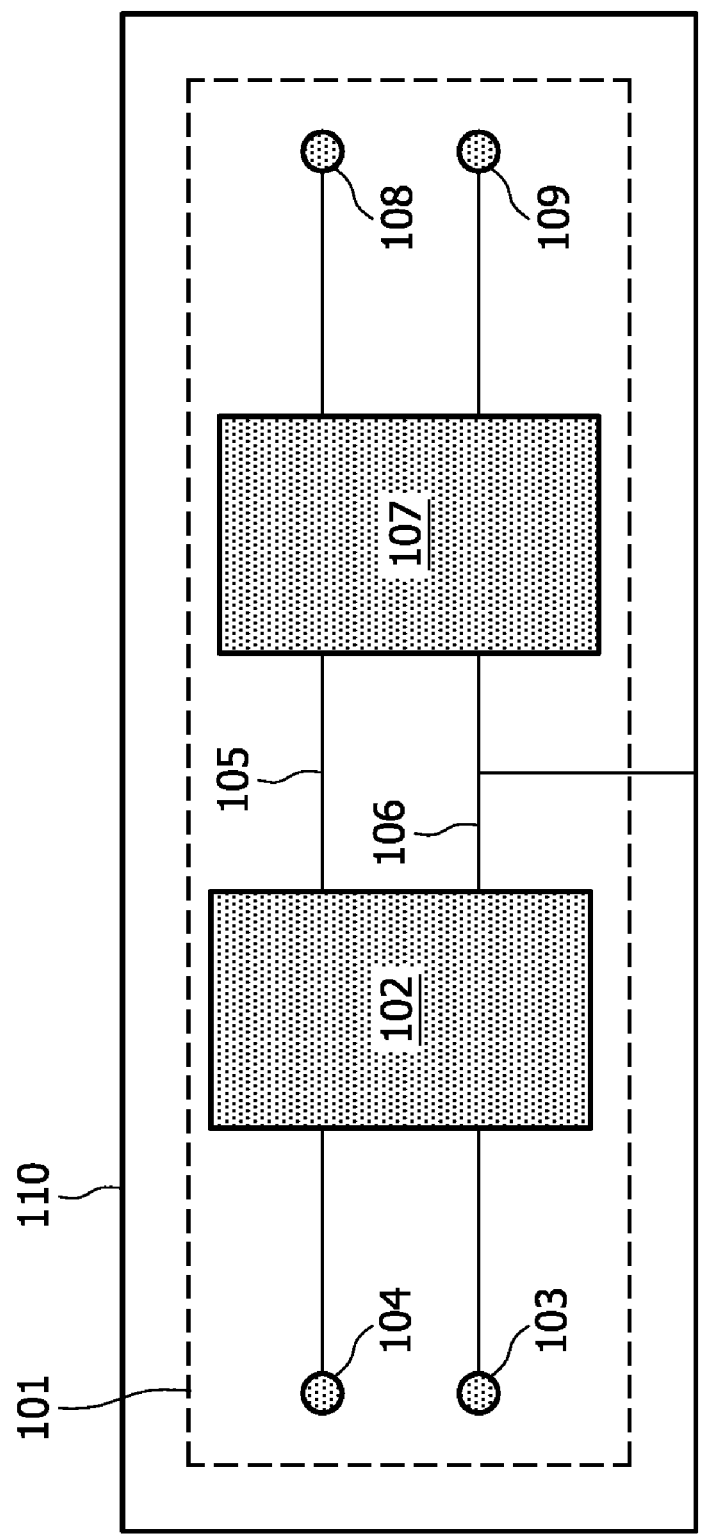
FIG. 1 is a functional schematic of the electromagnetic interference suppressing apparatus according to the present utility model.

FIG. 1 is a functional schematic of the electromagnetic interference suppressing apparatus according to the present utility model. In this figure, the part within the dashed block is a high-frequency signal generation device 101. The high-frequency signal generation device 101 comprises a rectifying means 102 for converting a conventional alternating current voltage signal inputted through two inputs 103, 104 into a direct current voltage signal and outputting such a signal, wherein the output 105 is a direct current voltage bus and the output 106 is a reference zero voltage point. The high-frequency signal generation device 101 comprises further an inverter means 107 for converting the previously obtained direct current voltage signal into a high-frequency alternating current signal and outputting such a signal via outputs 108, 109. The high-frequency signal generation device 101 may also comprise other circuit means, such as a startup circuit, circuits or means using the outputted high-frequency alternating current signal in operation, and various conventional circuits or means needed in the processing of various electrical signals as desired, etc., all of which are not shown in this figure. During the operation of the high-frequency signal generation device 101, various high-frequency interference signal may be generated, which may be propagated spatially by way of electromagnetic radiation, forming radiation interference, or may be inputted to the terminals 103,104 by various ways, for example, connection or coupling, forming transmission interference to the external electric network through the terminals 103,104.

According to the present embodiment, an electric conductor 110 is disposed as the means being in capacitive or inductive coupling with the high-frequency signal generation device 101 and connected to the reference zero voltage point of the high-frequency signal generation device 101.

An analysis is made as follows for the capacitive effect between the electric conductor 110 and the high-frequency signal generation device 101. There is distributed capacitance between the electric conductor 110 and the high-frequency signal generation device 101. The capacitive value of the distributed capacitance meets the following relation:

$$C = \epsilon \times S/d$$

where, C is the capacitive value between the electric conductor 110 and the high-frequency signal generation device 101, S is the effective overlap area between the electric conductor 110 and the high-frequency signal generation device 101, d is the average distance between the electric conductor 110 and the high-frequency signal generation device 101, and $\epsilon$ is the absolute dielectric constant of the dielectric material between the electric conductor 110 and the high-frequency signal generation device 101. The capacitive impedance Xc between the electric conductor 110 and the high-frequency signal generation device 101 meets the following relation:

$$Xc = 1/(2\pi f \times C)$$

that is to say, the higher the capacitance between the electric conductor 110 and the high-frequency signal generation device 101 is, the less the capacitive impedance.

Meanwhile, the capacitor has the circuit characteristic of "allowing the alternating current to pass through while insulating the direct current and allowing the high frequency to pass through while blocking the low frequency". In this way, if the electric conductor 110 is short-circuited to the reference zero voltage point of the high-frequency signal generation device 101, the interference voltage formed by the high-frequency interference signal may, together with the reference zero voltage point 106, form a loop circuit, thus may be converted into an internal load of the high-frequency signal generation device 101, reducing electromagnetic interference to the outside.

Preferably, the electric conductor 110 may be configured to have a larger effective overlap area with the high-frequency signal generation device 101, for example, the electric conductor 110 may be configured as a metal enclosure surrounding the high-frequency signal generation device 101; meanwhile, the electric conductor 110 may be made as close as possible to the high-frequency signal generation device 101, especially to the major elements thereof. In this way, in the formula $C = \epsilon \times S/d$, as the value of S is larger and that of d is smaller, there is a very large value of capacitance between the electric conductor 110 and the high-frequency signal generation device 101, furthermore, since $Xc = 1/(2\pi f \times C)$, the reactance Xc between them is very small. In such a case, the high-frequency interference signal is very easy to form a low-reactance loop circuit with the reference zero voltage point via the capacitance C, thereby reducing electromagnetic interference to the outside.

Since the capacitor has the has the circuit characteristic of allowing the high frequency to pass through while blocking the low frequency, an analysis is made above for the capacitive effect between the electric conductor 110 and the high-frequency signal generation device 101. The manner of disposing and connecting of the electric conductor, using above capacitive effect, is useful to the reduction of the electromagnetic interference of the high-frequency signal generation device, in particular, to the reduction of the transmission interference. Likewise, there is inductive effect between the high-frequency signal generation device 101 and the electric conductor 110, namely, the interference signal generated by the high-frequency signal generation device 101 may be propagated spatially by way of electromagnetic inductance, forming radiation interference. An earthed electric conductor, especially an electric conductor in the form of metal enclosure, may reduce effectively such radiation interferences. In the present utility model, on the contrary to the manner of earthing generally used, the electric conductor 110 is short-circuited to the reference zero voltage point 106 of the high-frequency signal generation device, converting the interference signal into an internal load, thereby reducing effectively the electromagnetic interference of the interference signal in case that the high-frequency signal generation device 101 is not readily to be earthed.

Although analysis is made above respectively for the capacitive and inductive effects between the electric conductor 110 and the high-frequency signal generation device 101, in practice, the capacitive and inductive effects may be found simultaneously in a circuit. For the electromagnetic interference generated by the high-frequency signal generation device, attention should be paid to the spatial shape and position relation of the electric conductor from the point of view of the capacitive effect.

Figure 2:
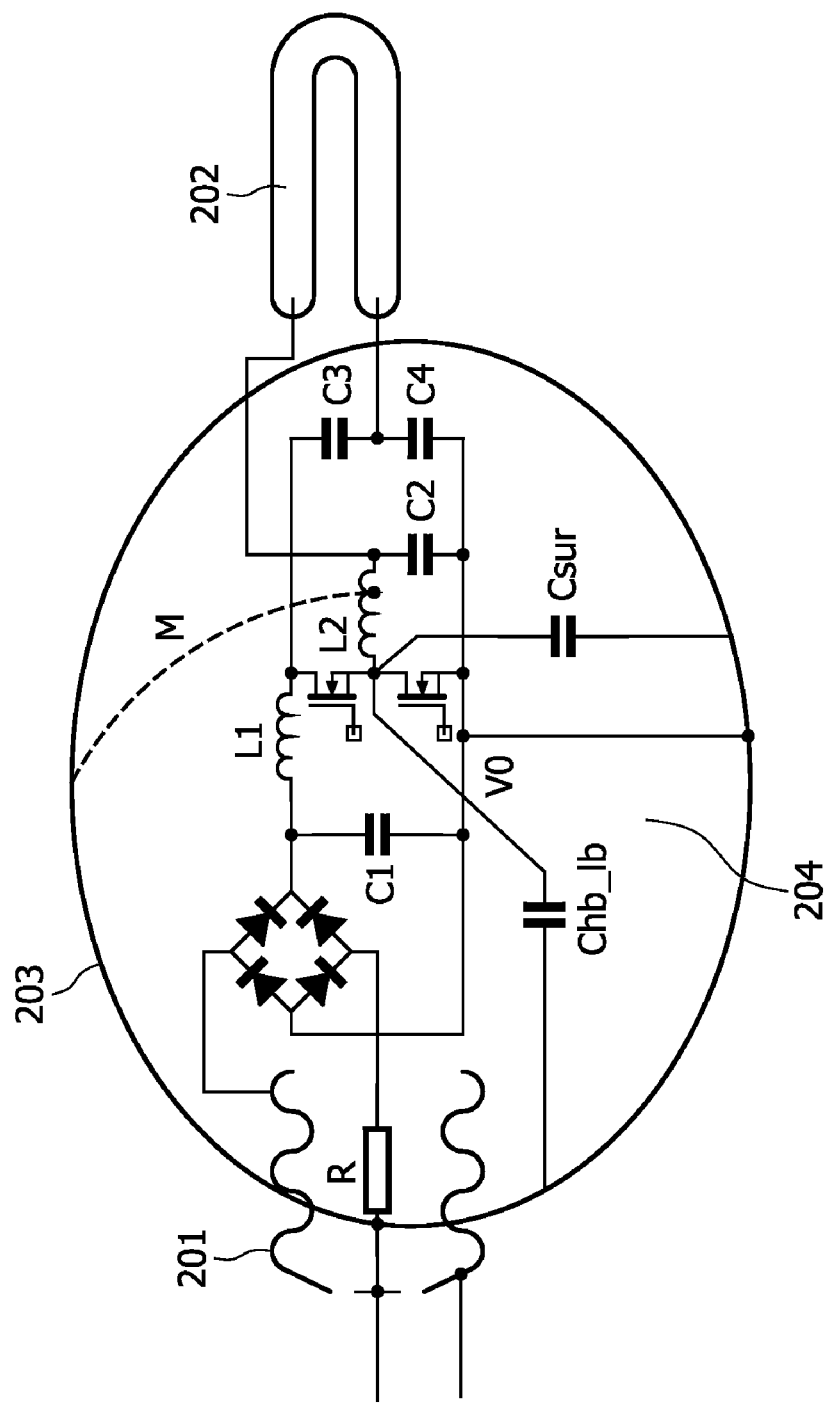
FIG. 2 is a schematic circuit diagram of the electronic ballast system according to the present utility model.

FIG. 2 is a schematic circuit diagram of the electronic ballast system according to the present utility model. This is a typical electronic ballast circuit for driving a fluorescent lamp. A lamp head portion 201 is connected to a lamp tube 203 via a ballast circuit 202. The elliptical curve in the figure represents an electric conductor 204 disposed around the ballast circuit 202. The ballast is a typical high-frequency signal generation device for driving fluorescent lamps, which generally includes a rectifying means for converting a low-frequency alternating current signal into a direct current signal, an inverter means for converting the direct current signal into a high-frequency alternating current signal and other necessary circuits. The electric conductor is disposed around the ballast circuit, forming a metal enclosure, which is in capacitive or inductive coupling with the ballast and connected to the reference zero voltage point of the direct current signal. During the operation of the ballast, the generated high-frequency alternating current signal, besides driving the operation of the fluorescent lamp, generates also a more severe high-frequency interference signal, forming an interference voltage in the circuit. In this figure, Chb_lb and Csur schematically show the capacitive coupling relation between the ballast circuit 202 and the metal enclosure 204, while M schematically shows the inductive coupling relation between the ballast circuit 202 and the metal enclosure 204. Different elements and different positions in the ballast circuit 202 have different results and intensities with respect to capacitive effect and inductive effect. What is important is that the metal enclosure 204 is short-circuited at a node V0 and the reference zero voltage point of the direct current signal in the ballast circuit. In the case where the physical earthing is not achievable, the connection between the metal enclosure and the reference zero voltage point of the direct current signal may effectively have the high-frequency interference signal formed an internal loop circuit, converting into an internal load of the ballast, thereby reducing electromagnetic interference to the outside.

Figure 3:
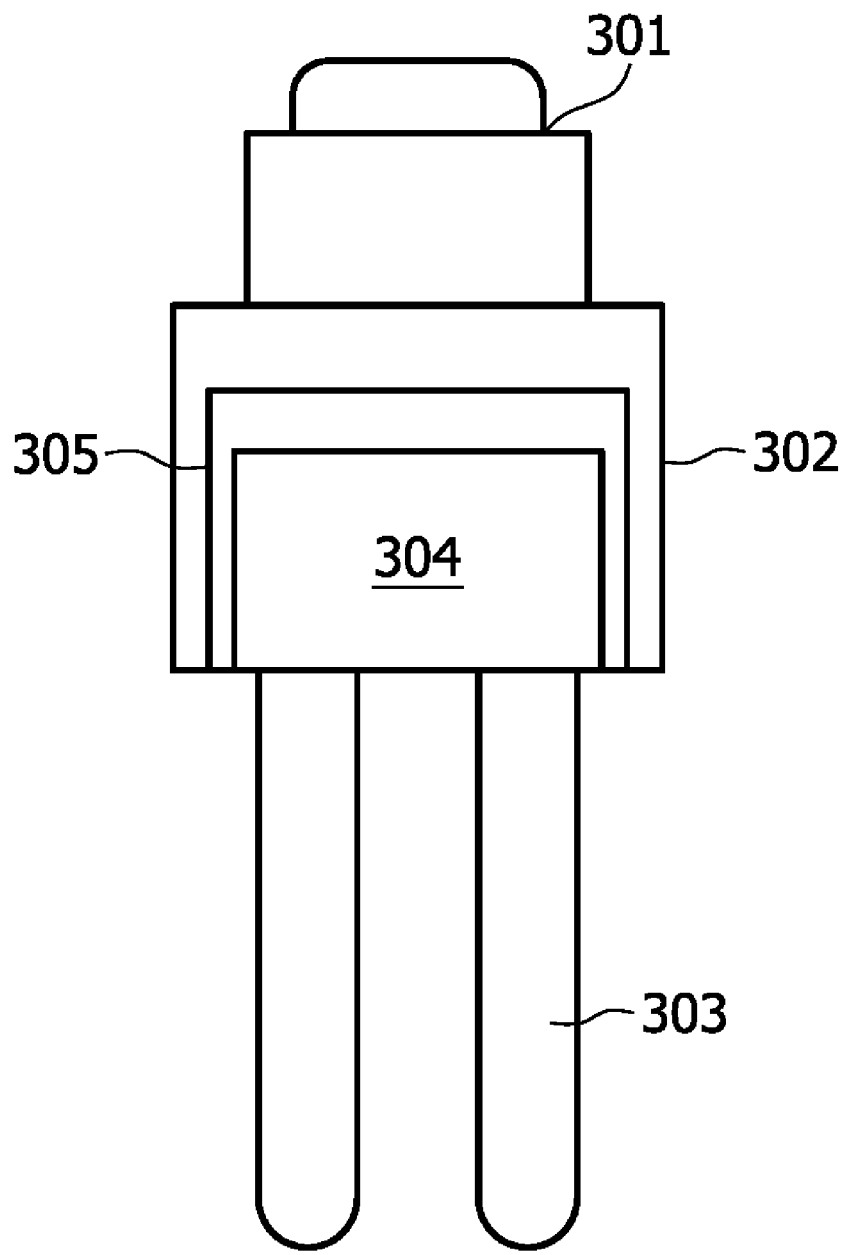
FIG. 3 is a construction schematic of the energy-saving lamp of compact type according to the present utility model.

FIG. 3 is a construction schematic of the energy-saving lamp of compact type according to the present utility model. An energy-saving lamp of compact type is a favorite light source widely used, since it may be readily mounted within the holder of a common incandescent lamp and has the light-emission efficiency of a fluorescent lamp. However, the electromagnetic interference generated by an energy-saving lamp of compact type is often more severe. Since the ballast of an energy-saving lamp of compact type is often designed integrally and is present in the narrow space of the lamp enclosure, its electromagnetic interference is not easily to be suppressed using a complicated filter circuit design; in addition, the requirement of flexible and convenient installation makes it impossible to ensure the reliable earthing of the ballast circuit in the fluorescent lamp of compact type, which limits the adoption of measures for suppressing the electromagnetic interference. The present utility model significantly increases the electromagnetic compatibility at a low cost without the need for the physical earthing.

The fluorescent lamp of compact type shown in FIG. 3 comprises a lamp head portion 301, an lamp enclosure portion 302, in which a ballast 304 is disposed, and a lamp tube 303. According to the principle of the present utility model, a metal enclosure may be disposed between the lamp enclosure 302 within the enclosure portion and the ballast 304. The metal enclosure surrounds (or partially surrounds) the ballast 304 and is connected to the reference zero voltage point of the direct current voltage in the ballast circuit via a low-resistance lead. Thus, the metal enclosure is a particular means for suppressing electromagnetic interference and, on the basis of the principle which is the same as that of the above embodiments, such a design may effectively reduce the electromagnetic interference generated by the high-frequency alternating current signal of the ballast. Experiments have proved the effect of the electromagnetic compatibility of this technical solution.

While the present utility model has been explained and described in detail in the drawings and the description above, it should be understood that these explanations and descriptions are just illustrative and exemplary, and not limiting. The present utility model shall be not limited to the embodiments as disclosed.

Modifications to the disclosed embodiments may be understood and implemented by those skilled in the art upon understanding of the drawings, the disclosed contents and the accompanying claims. In the claims, the meaning of "comprising" does not exclude other elements or steps, and the term "a" or "an" does not exclude a plurality. A single unit may fulfill the functions of several means recited in the claims. Any reference sign in the claims shall not be construed as limiting the scope of this utility model.

The invention claimed is:

1. An electromagnetic interference suppressing apparatus for a high-frequency signal generation device, the high-frequency signal generation device comprising an inverter means which is used for converting a direct current signal into a high-frequency alternating current signal, wherein the electromagnetic interference suppressing apparatus includes an electric conductor which is in capacitive or inductive coupling with the high-frequency signal generation device and is connected to the reference zero voltage point of the direct current signal wherein said capacitive or inductive coupling allows the alternating current to pass through while insulating the direct current and allows the high frequency to pass through while blocking the low frequency and wherein the electric conductor is short-circuited to the reference zero voltage point of the high-frequency signal generation device and the interference voltage formed by the high-frequency interference signal together with the reference zero voltage point forms a loop circuit and is converted into an internal load of the high-frequency signal generation device.

2. The electromagnetic interference suppressing apparatus according to claim 1, wherein the electric conductor is a metal enclosure surrounding the high-frequency signal generation device.

3. The electromagnetic interference suppressing apparatus according to claim 1, wherein the high-frequency signal generation device is an electronic ballast for driving a gas discharge lamp in operation.

4. An electronic ballast system, comprising an electronic ballast and an electric conductor; the electronic ballast including a rectifying means for converting a low-frequency alternating current signal into a direct current signal and an inverter means for converting the direct current signal into a high-frequency alternating current signal; the electric conductor being disposed around the electronic ballast, coupled to the electronic ballast via a capacitor or an inductor and connected to the reference zero voltage point of the direct current signal, wherein said capacitor or inductor allows the alternating current to pass through while insulating the direct current and allows the high frequency to pass through while blocking the low frequency and wherein the electric conductor is short-circuited to the reference zero voltage point of the electronic ballast and the interference voltage formed by the high-frequency interference signal together with the reference zero voltage point, forms a loop circuit, and is converted into an internal load of the electronic ballast.

5. An energy-saving lamp of a compact type, comprising a lamp enclosure portion; the enclosure portion being provided with an electronic ballast inside, and the electronic ballast including a rectifying means for converting a low-frequency alternating current signal into a direct signal and an inverter means for converting the direct current signal into a high-frequency alternating current signal; the lamp enclosure portion including a metal enclosure inside, the metal enclosure being disposed between the electronic ballast and the lamp enclosure, coupled to the electronic ballast via a capacitor or an inductor and connected to the reference zero voltage point of the direct current signal in the electronic ballast wherein said capacitor or inductor allows the alternating current to pass through while insulating the direct current and allows the high frequency to pass through while blocking the low frequency and wherein the electric conductor is short-circuited to the reference zero voltage point of the electronic ballast and the interference voltage formed by the high-frequency interference signal together with the reference zero voltage point forms a loop circuit and is converted into an internal load of the electronic ballast.

* * * * *